Feb. 10, 1948. E. G. REED 2,435,797
METHOD OF PRODUCING SHOE UPPERS BY HEAT-SHRINKING TO FORMS
Filed Feb. 23, 1945
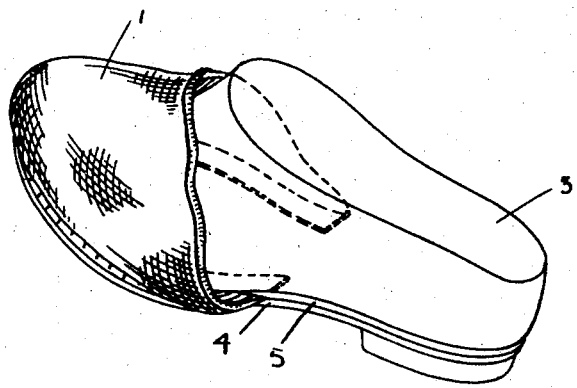
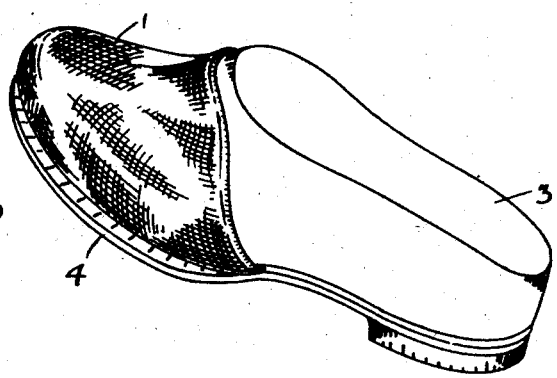
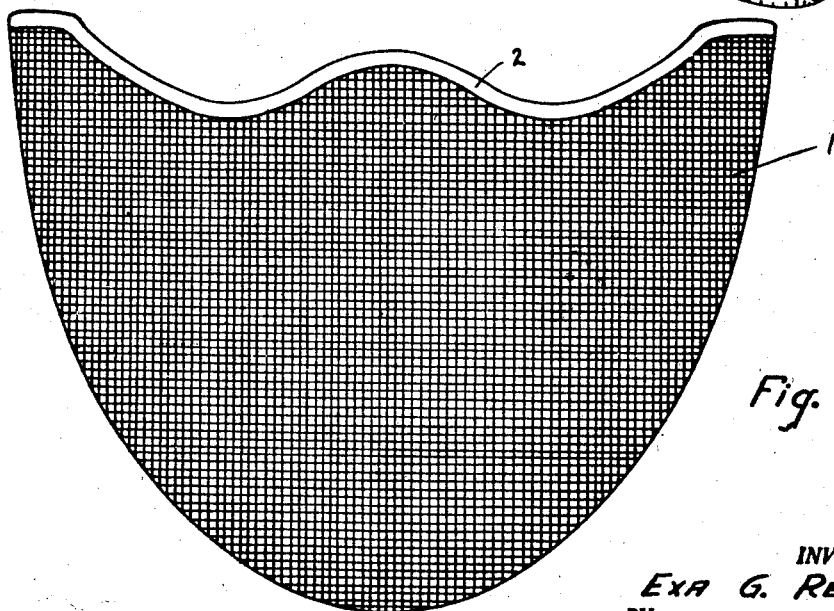
INVENTOR.
EXA G. REED
BY R. H. Waters Patented Feb. 10, 1948

2,435,797

UNITED STATES PATENT OFFICE 2,435,797

METHOD OF PRODUCING SHOE UPPERS BY HEAT-SHRINKING TO FORMS

Exa G. Reed, Akron, Ohio, assignor to Wingfoot Corporation, Akron, Ohio, a corporation of Delaware Application February 23, 1945, Serial No. 579,351

3 Claims. (Cl. 12—142)

This invention relates to shoe uppers. The uppers are made by temporarily covering a shoe last or the like with a heat-shrinkable fabric and then shrinking the fabric to fit the last. The shrunken formed fabric is not removed from the last until the fabric has cooled and thus been set.

For some time there has been on the market a rubber hydrochloride film. Such a film may be formed as described in Calvert United States Patent 1,989,632. It may be cast from a solution of rubber hydrochloride in a volatile organic solvent. This film, as marketed, will shrink a small amount on heating. According to this invention the film is heated and stretched and then formed into a fabric. It may be heated and stretched and cut into strips and the strips rolled or twisted into strands which may be used in forming the rubber hydrochloride fabric used in carrying out the invention. The heat-shrinkable strands may be formed in any suitable manner.

A stretched rubber hydrochloride product will shrink to its unstretched dimensions when it is heated. The fabric from which the articles of the present invention are produced is formed of strands which have been stretched some 50 per cent or more, and may be stretched as much as 500 per cent or more. The stretching not only makes the strands heat-shrinkable, but strands made of stretched film possess a luster and other properties which the unstretched film does not possess. The temperature used in shrinking the stretched film will vary, depending upon the amount of plasticizer in the film, the speed at which the film is passed through the stretching equipment, etc. In general, heating in the range of about 125 or 150° F. up to 220° F. or higher will make the rubber hydrochloride readily stretchable. Temperatures over 500° F. may be used for stretching if the film is quickly heated and stretched and immediately cooled. After stretching, the material should be held in the stretched condition until it has cooled and set.

A preferred type of strand for carrying out this invention is produced by rolling or twisting a strip of the film while heating and stretching it. During the rolling or twisting, overlapping portions of the heated film may be pressed together with sufficient pressure to cause them to become permanently heat-sealed to one another. Twisted, stretched strands which have not been thus compacted by heat-sealing may be used. Different effects are produced by employing strands made in different ways.

The fabric which is to be shrunken may be formed by weaving, crocheting, knitting or in any suitable manner. Differently colored strands may be used to produce attractive effects.

According to this invention the fabric made of strands of stretched rubber hydrochloride or the like is placed over a shoe last or other suitable form, and the edges are held in place while the fabric is heated so that on shrinking, the entire fabric does not shrink evenly, but certain areas shrink more than others so that the shrunken fabric conforms to the shape of the last or form. Preferably, the major portion of the fabric is not shrunken at all.

The invention will be further described in connection with the accompanying drawings, in which:

Fig. 1 illustrates how the fabric is held in place over the form before shrinking;

Fig. 2 shows the finished shoe or sandal on the last; and

Fig. 3 illustrates a piece of the woven fabric for use on a sandal such as shown.

In Fig. 3 the fabric 1 is illustrated generally without any indication as to its exact nature; i. e., whether it is woven, crocheted or formed in another manner. It is shaped for use on a sandal although it is to be understood that the uppers for any type of shoe including men's business and sport shoes, women's and children's shoes may all be made in the manner described. It is bound at one edge by any suitable binding tape 2.

Fig. 1 illustrates how the fabric of stretched thermo-shrinkable plastic material is placed loosely over a last or other form 3 with the edge held between the two sole portions 4 and 5. On heating, the fabric shrinks until it fits snugly over the form, as shown in Fig. 2. The shrinking need not exceed about 15 to 20 per cent in the areas affected. Certain portions of the fabric need not shrink at all. After the fabric has cooled and therefore set, the form is removed, and the shoe is ready for marketing.

The uppers of ordinary, every-day shoes for men, women, and children, sandals and slippers and sportswear, etc., may be formed in this manner. The uppers may be shrunk to shape and then assembled on a sole, with a heel where required; or (as shown) the upper may be fastened to the sole before shrinking. The fabric is preferably placed squarely across the instep so that if woven, the warp or woof runs directly across the instep from one side to the other.

Rubber hydrochloride film about .001 inch thick has been found suitable for making the shrinkable fabric from which the shoe uppers are formed. For instance, this film may be heated and then stretched to several hundred per cent of its original area, for example, 400 per cent. The stretched film may then be cut into strips about 2 to 4 inches wide. The stretching is advantageously effected along a single axis, the axis running lengthwise of the strips. These strips may be rolled or twisted or otherwise compacted to form a strand or thread-like structure. These strands are then woven or otherwise assembled into a fabric. Fabric which is tightly woven of narrow flat ribbons has proved most satsifactory for shoes for every-day wear. Shrinking stiffens such tightly woven fabric as it brings the ribbons closer together.

In forming the shoe upper, the rubber hydrochloride fabric, after being placed over the last with the edges held against displacement, is shrunk to shape by heating to a temperature in the neighborhood of 125° F., more or less, as required. This may be done by placing the last covered with the fabric in an oven for several minutes or subjecting it to a jet of hot air or the like. The heating relieves the strains in the stretched fabric, and it shrinks to fit the last. The heating may be limited to the areas which are to be shrunk.

The fabric may be made from rubber hydrochloride in any desired manner. Weaving is preferred. A preferred form of woven fabric is formed of strands made by rolling or twisting or crumpling strips of stretched film about ⅛ inch to several inches in width. The film may be stretched as much as 600 or 700 per cent. Such thin, crumpled material reflects the light in a pleasing way. The film may be either tightly or loosely rolled or twisted. For example, the warp may be of tightly twisted material, and the woof may be of loose crumpled material. The fabric may be loosely woven, but most satisfactory results have thus far been obtained with tightly woven fabric. Many attractive effects may be obtained by using different colors and strands constructed in different ways.

Although the invention has been described more particularly with respect to the production of uppers from stretched rubber hydrochloride film, it is to be understood that the uppers may be similarly produced from fabric composed of other heat-shrinkable plastic material.

What I claim is:

1. The method of producing a shoe upper which comprises covering a last with a flat fabric of heat-shrinkable plastic strands with the bottom edge of the fabric fastened to a shoe sole, and then heating the fabric to cause it to shrink to the form of the last and allowing the fabric to cool until it sets before removing the shoe from the last.

2. The method of producing a shoe upper which comprises covering a last with a flat woven fabric of heat-shrinkable strands of plastic material with the bottom edge of the fabric fastened to a shoe sole, and then heating the fabric to cause it to shrink to the form of the last and allowing the fabric to cool until it sets before removing the shoe from the last.

3. The method of producing a shoe upper which comprises covering a last with a flat woven fabric of heat-shrinkable strands composed essentially of rubber hydrochloride with the bottom edge of the fabric fastened to a shoe sole, and then heating the fabric to cause it to shrink to the form of the last and allowing the fabric to cool until it sets before removing the shoe from the last.

EXA G. REED.

REFERENCES CITED

The following references are of record in the file of this patent:

UNITED STATES PATENTS

| Number | Name | Date |
|---|---|---|
| 278,305 | Moulton | May 22, 1883 |
| 625,331 | Heaton | May 23, 1899 |
| 1,081,955 | Green | Dec. 23, 1913 |
| 1,344,930 | Wolff | July 29, 1920 |
| 1,514,634 | Seely | Nov. 11, 1924 |
| 2,262,861 | Rugeley | Nov. 18, 1941 |
| 2,312,089 | Gobielle | Feb. 23, 1943 |
| 2,314,098 | McDonald | Mar. 16, 1943 |
| 2,345,055 | Lilley | Mar. 28, 1944 |